United States Patent
Burkart et al.

(10) Patent No.: US 6,739,239 B1
(45) Date of Patent: May 25, 2004

(54) CASTON PISTON

(75) Inventors: Stefan Burkart, Rottenberg (DE); Egon Stratmann, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 10/070,090
(22) PCT Filed: Sep. 2, 2000
(86) PCT No.: PCT/DE00/03023
§ 371 (c)(1), (2), (4) Date: May 15, 2002
(87) PCT Pub. No.: WO01/18432
PCT Pub. Date: Mar. 15, 2001

(30) Foreign Application Priority Data

Sep. 4, 1999 (DE) .......................... 199 42 293

(51) Int. Cl.$^7$ ................................. F16J 1/04
(52) U.S. Cl. ........................... 92/212; 92/222
(58) Field of Search .................... 92/212, 222, 248

(56) References Cited

U.S. PATENT DOCUMENTS

| | | | |
|---|---|---|---|
| 4,528,895 A | * | 7/1985 | Nakamura ............ 92/248 |
| 4,998,461 A | * | 3/1991 | Ishiwata et al. ............ 92/248 |
| 5,031,511 A | | 7/1991 | Villata |
| 5,377,580 A | * | 1/1995 | Merklein et al. ............ 92/248 |
| 5,617,725 A | * | 4/1997 | Yasuda ............ 92/248 |

FOREIGN PATENT DOCUMENTS

| | | |
|---|---|---|
| DE | 42 43 445 A | 6/1994 |
| DE | 42 33 896 C | 6/1995 |
| WO | 97 18403 A | 5/1997 |

* cited by examiner

Primary Examiner—F. Daniel Lopez
(74) Attorney, Agent, or Firm—Michael J. Striker

(57) ABSTRACT

The invention relates to a molded piston, in particular an injection-molded piston (1) of fiber-reinforced plastic, which is seated slidably in a receiving bore (2) of a housing (4) and is embodied as a cup-shaped body with a piston bottom (6) and a sleevelike piston wall (8) protruding away from the bottom, and the face (10) of the piston bottom (6) pointing away from the piston wall (8) is pressure-loadable, and there is at least one injection point (46) oriented with a molding channel of a molding tool.

The invention proposes that the injection point (46) is disposed on the other face (22) of the piston bottom (6), that is, the face pointing away from the pressure-loadable face (10), and the piston bottom (6), because of one or more recesses (48) present in this face (22), has a lesser wall thickness in the region of the injection point (46) than in the regions (52) adjoining it.

5 Claims, 1 Drawing Sheet

CASTON PISTON

BACKGROUND OF THE INVENTION

The invention is based on a molded piston, in particular an injection-molded piston of fiber-reinforced plastic.

One such piston is known from German Patent DE 42 33 896 C2. The known piston is received slidably in a receiving bore of a housing and embodied as a cup-shaped body with a piston bottom and a sleevelike piston wall protruding away from it. Between the face of the piston bottom pointing away from the piston wall and the bottom of the receiving bore, a pressure chamber is formed, which when pressure is exerted on it increases in size, counter to the force of a piston spring that is prestressed counter to the piston.

The known piston is produced by injection molding in an injection-molding tool, which is likewise cup-shaped and on its bottom has an injection-molding channel for pressure-injection of a thermoplastic plastic into a chamber between the inner wall of the tool and a cylindrical core; this interstice, filled with injection-molding material under pressure, is shaped in accordance with the geometry of the piston. In the region of the so-called injection point of the molded piston, that is, opposite the outlet opening of the injection-molding channel, an injection cone forms on the face of the piston bottom on which pressure is exerted in operation, and this injection cone is troublesome in the sense that once the piston has been inserted into the receiving bore of the housing, the injection cone protrudes into the pressure chamber and must therefore be removed, for instance by cutting-type machining, which entails a certain amount of production effort and expense.

From U.S. Pat. No. 5,031,511, a piston of this generic type is known, having a peg formed centrally onto its bottom; the peg protrudes from the face that points away from the pressure-loadable face. A pivotable thrust piece for pressing a brake lining against a brake disk of a disk brake is received on the peg. The bottom of the piston is provided, toward the peg, with a rounded recess of low depth, which extends radially spaced apart from the peg and creates a free space into which the thrust piece can move upon a pivoting motion. U.S. Pat. No. 5,031,511 discloses nothing about the location of the injection point of the piston.

In International Patent Disclosure WO-A 97/18403, FIG. 7, a molded piston is disclosed that has an axially deep encompassing recess, which originates on the face end of the piston that points away from the pressureloadable face. The recess defines a peg, which like the recess and the face end of the piston is enveloped by a sheet-metal part that is indented in the injection molding of the piston. Consequently, an injection point can be located only in the region of the pressure-loadable face or of the piston jacket.

Accordingly, in the invention, the injection point is shifted to the other side, pointing away from the pressure-loadable face on the piston bottom, because in that location, the injection cone is not troublesome. Since from pressure exerted on the pressure chamber the piston bottom is a plate substantially stressed by bending, in operation on the one hand a region subject to compressive stresses develops in a known way, extending from the pressure-loadable face of the piston bottom as far as a neutral fiber in the interior of the piston bottom; on the other, a region subject to tensile stresses develops, which extends from the neutral fiber up to the face of the piston bottom that points away from the pressure-loadable face. If the injection point were not shifted to the face of the piston bottom pointing away from the pressure-loadable face, without any other provisions being made, then the injection point would be located at a point where the tensile stresses are greatest. Since the injection point of an injection-molded part is known to be shot through with bubbles and porosities, however, the strength properties there are critical. Another factor is that in injection-molding materials, as a rule the maximum tensile strength is less than the maximum pressure strength, so that under the high pressures that such a piston can be exposed to in operation, cracks and breaks can occur on the piston bottom.

As a result of at least one recess on its face pointing away from the pressure-loadable face of the piston bottom, the piston bottom has a lesser wall thickness in the region of the injection point than in the regions adjoining it. Since location of the neutral fiber of the entire piston bottom is determined essentially by the radially outer regions, adjoining the middle region of the injection point, the wall region of the piston bottom located on the side of the tensile stress is removed entirely or in part by means of the at least one recess in the region of the injection point. Accordingly, as a result of the recess in the region of the injection point that is critical in terms of strength, the wall region subjected to tensile is reduced in size, so that the remainder is free of tensile stress or predominantly pressure relieved, which has a favorable effect on the strength properties.

In order to avoid the tensile stresses in the piston bottom in the vicinity of the injection point, which are unfavorable in terms of strength, it is proposed in accordance with an especially preferred embodiment that the at least one recess is embodied as deep enough that the piston bottom face pointing away from the pressure-loadable face, extends from the direction of the pressure-loadable face, in the region of the injection point, at most as far as a plane that includes the neutral fiber of the regions of the piston bottom that adjoin the region of the injection point. If there is coplanarity between this plane that includes the neutral fiber and the face of the piston bottom pointing away from the pressure-loadable face, then the tensile stresses in this face are equal to zero, while in the case of relatively deep recesses, this face is subjected solely to pressure.

In the preferred embodiment, the at least one recess is embodied annularly and surrounds a truncated cone or feeder pointing away from the piston bottom and coaxial with the piston axis, on the free end of which truncated cone or feeder the injection point is located. Because of the centrally-disposed truncated cone, the strength-critical porosities are located in a substantially stress-free region. Moreover, this creates an additional volume, which can absorb any microstructural flaws, caused by erroneous injection-molding parameters, in a virtually stress-free region. Alternatively, the at least one recess can be a fully cylindrical recess disposed coaxially with the piston axis.

BRIEF DESCRIPTION OF THE DRAWINGS

Exemplary embodiments of the invention are shown in the drawings and explained in further detail in the ensuing description.

DESCRIPTION OF THE PREFERRED EMBODIMENTS

Figure 1:
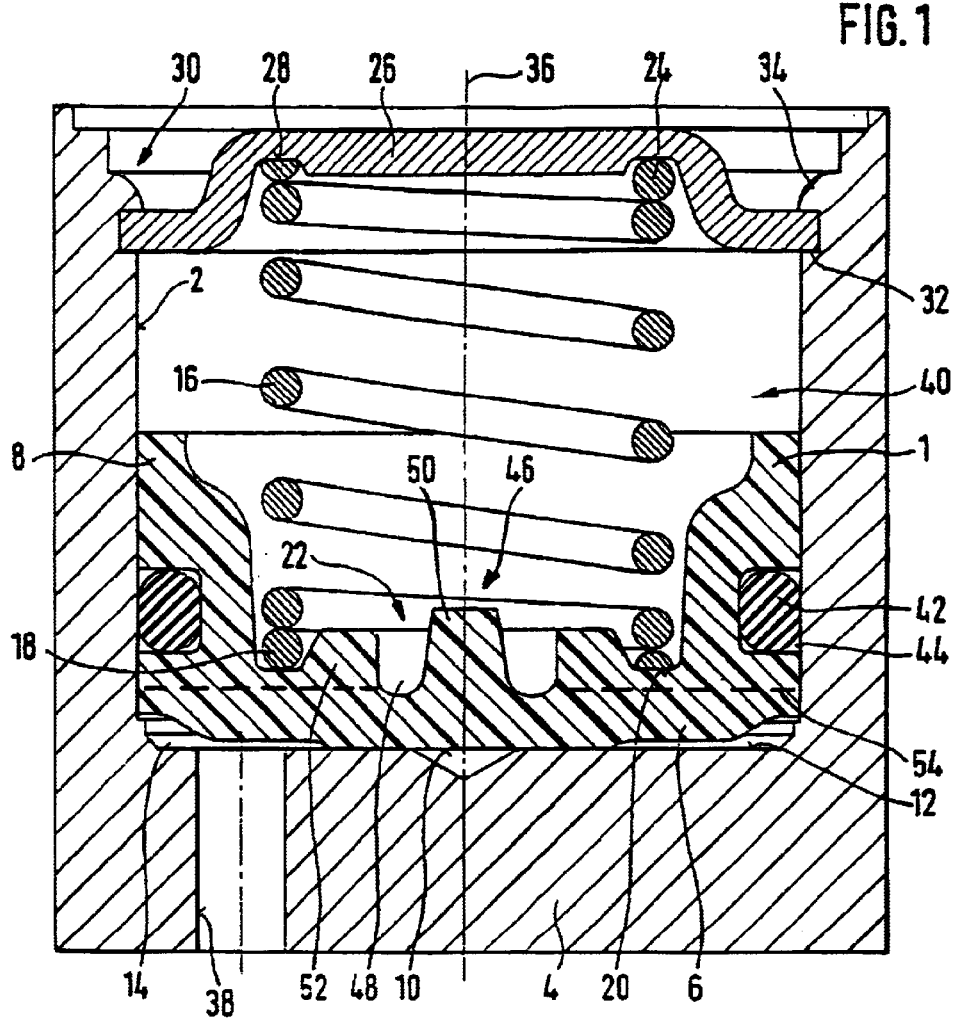
FIG. 1 shows a longitudinal section through a preferred exemplary embodiment of a piston according to the invention, which is received slidingly in a receiving bore of a housing.

The piston marked 1 in FIG. 1, in accordance with a preferred embodiment, is a storage piston of a traction-controlled vehicle brake system and is received in a receiving bore 2, embodied as a blind bore, of a housing 4. The storage piston 1 for instance comprises fiber-reinforced plastic and is embodied as a cup-shaped body with a piston bottom 6 and a sleevelike piston wall 8 protruding away from it. Between the face 10 of the piston bottom 6 pointing away from the piston wall 8 and the bottom 12 of the receiving bore 2, a pressure chamber 14 is formed, which upon pressure imposition increases in size counter to the force of a piston spring 16 that is prestressed counter to the storage piston 1; when the pressure drops, this spring returns the storage piston 1 back to its outset position shown in FIG. 1.

One end 18 of the piston spring 16 is braced in a radially outer annular groove 20, which is embodied in the face 22 pointing away from the pressure-loaded face 10 of the piston bottom 6, while the other end 24 of the piston spring 16 is braced against a cap 26 that closes the receiving bore 2 of the housing 4. To that end, an indentation with an annular groove 28 that receives the other end 24 of the piston spring 16 is formed onto the cap 26.

The cap 26 is preferably braced in pressure-tight fashion against a radially inner shoulder 32 of the receiving bore 2 by means of a calked heel 30. To that end, material is forced from the edge of the receiving bore 2 toward the edge of the cap 26, creating a bead 34 of material that covers the edge of the cap 26.

By means of a conduit 38 embodied in the bottom 12 of the receiving bore 2 and extending parallel to the piston axis 36, the pressure chamber 14 communicates with a brake line, not shown, of the traction-controlled vehicle brake system; as a result, brake fluid that is under pressure can reach the pressure chamber 14 and increase its size counter to the force of the piston spring 16. Since the operating pressure of the brake fluid can briefly reach levels of $100 \times 10^5$ Pa, the pressure load on the piston bottom 6, which is essentially a plate stressed by bending, is correspondingly high.

To seal off the pressure chamber 14 from the remaining, essentially pressure-free housing interior 40, an O-ring 42 is provided, which is received in an annular groove 44 disposed on the outer circumference of the storage piston 1.

The storage piston 1 is preferably made by injection molding; according to the invention, the injection point 42 is located on the face 22 of the piston bottom 6 pointing away from the pressure-loadable face 10, and preferably along the piston axis 36. To limit or prevent the incidence of tensile stresses in the region of the strength-critical injection point 46, the piston bottom 6 stressed by bending has a recess 48, for instance annular in shape, coaxial with the piston axis 36, in the region of the injection point 46; this recess surrounds a truncated cone or feeder 50 protruding from the piston bottom 6 and coaxial with the piston axis 36, and the injection point 46 is located on the free end of this truncated cone or feeder. The feeder 50 is located opposite the injection-molding channel of the injection-molding tool, not shown, or protrudes partway into it.

The gap created by the annular recess 48 prevents the transmission of tensile stresses from the radially outer regions 52 to the feeder 50. Since the feeder 50 has a relatively small diameter, furthermore no significant tensile stresses are generated there upon bending stress on the piston bottom 6.

Because of the annular recess 48, the piston bottom 6 has a lesser wall thickness in the region around the injection point 46 than in the regions 52 adjoining it and located radially farther outward. Preferably, the annular recess 48 is embodied as deep enough that the face 22 of the piston bottom 6, pointing away from the pressure-loadable face 10, in the region of the injection point 46 is located in a plane that includes the neutral fiber of the radially outer regions 52 of the piston bottom 6 adjoining the region of the injection point 46. In FIG. 1, the neutral fiber is represented as a dot-dashed line 54. By this means it is assured that when pressure is exerted on the pressure chamber 14, the face 22 of the piston bottom 6 pointing away from the pressure-loadable face 10, in the region of the injection point 46, is located at the level of the neutral fiber 54 of the surrounding, radially outer regions 52 and is therefore essentially stress-free.

Alternatively, in the region of the injection point 46 and viewed from the pressure-loadable face 10, the face 22 of the piston bottom 6 pointing away from the pressure-loadable face 10 could have a slight spacing from the plane of the neutral fiber 54. In that case, the piston bottom 6 would be loaded by compressive stresses in the region of the injection point 46.

Figure 2:
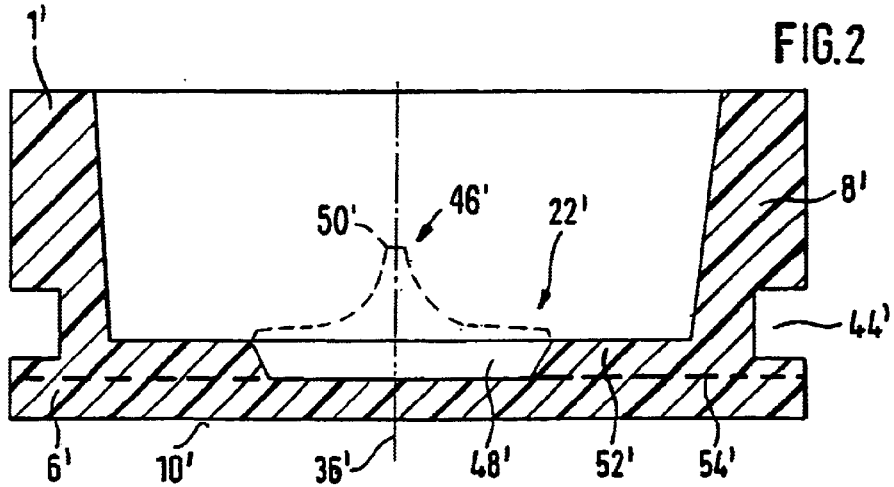
FIG. 2 is a schematic longitudinal section through a further exemplary embodiment of a piston according to the invention.

In FIG. 2, a further embodiment of a storage piston 1' of the invention is shown, in which the feeder has been removed by cutting-type machining, and therefore in the region of the injection point 46' a fully cylindrical recess 48' is formed, which is coaxial with the piston axis 36'. In this exemplary embodiment as well, the face 22' of the piston bottom 6' pointing away from the pressure-loadable face 10' is preferably located in the strength-critical region of the injection point 46' at the level of the neutral fiber 54' of the radially outer regions 52'. Alternatively, however, this face 22' in the region of the injection point 46' could also have a slight spacing from the plane of the neutral fiber 54'.

The invention is not limited to storage pistons 1 of fiber-reinforced plastic. On the contrary, it can be applied to any type of pistons that are produced by injection molding and therefore have one or even more strength-critical injection points.

What is claimed is:

1. An injection-molded piston of fiber-reinforced plastic seatable slidably in a receiving bore of a housing, the piston comprising a cup-shaped body with a piston bottom; a sleeve-like piston wall protruding away from said bottom, said piston bottom having a face which points away from said piston wall and is pressure-loadable, said piston bottom having another face pointing away from said pressure-loadable face and provided with at least one recess, so that said bottom as a result of said at least one recess has a lesser wall thickness than in regions adjoining it, said piston bottom being formed as a plate stressed by bending; at least one injection point orientable with a molding channel of a molding tool, said injection point being disposed on said other face of said piston bottom which points away from said pressure-loadable face, said piston bottom having said lesser wall thickness because of said at least one recess in a region of said injection point, said at least one recess being formed deep enough so that said other piston bottom face pointing away from said pressure-loadable face extends in a region of said injection point from a direction of said pressure-loadable face approximately as far as a plane that includes a neutral fiber of regions of said piston bottom that adjoins the region of said injection point.

2. An injection-molded piston as defined in claim 1, wherein said piston wall has a radially outer annular groove; and further comprising a sealing ring received in said radially outer annular groove so as to brace said piston against an inner wall of the receiving bore of the housing.

3. An injection-molded piston of fiber-reinforced plastic seatable slidably in a receiving bore of a housing, the piston comprising a cup-shaped body with a piston bottom; a sleeve-like piston wall protruding away from said bottom, said piston bottom having a face which points away from said piston wall and is pressure-loadable, said piston bottom having another face pointing away from said pressure-loadable face and provided with at least one recess, so that said bottom as a result has a lesser wall thickness than in regions adjoining it; at least one injection point orientable with a molding channel of a molding tool, said injection point being disposed on said other face of said piston bottom which points away from said pressure-loadable face, said piston bottom having a lesser wall thickness in a region of said recess, said at least one recess being formed deep enough so that said other piston bottom face pointing away from said pressure-loadable face extends in a region of said injection point from a direction of said pressure-loadable face approximately as far as a plane that includes a neutral fiber of regions of said piston bottom that adjoins the region of said injection point, said recess being annular and surrounding an element protruding away from said piston bottom and coaxial with a piston axis, said element having a free end on which said injection point is located.

4. An injection-molded piston as defined in claim 3, wherein said element is an element selected from the group consisting of a truncated cone and a feeder.

5. An injection-molded piston of fiber-reinforced plastic seatable slidably in a receiving bore of a housing, the piston comprising a cup-shaped body with a piston bottom; a sleeve-like piston wall protruding away from said bottom, said piston bottom having a face which points away from said piston wall and is pressure-loadable, said piston bottom having another face pointing away from said pressure-loadable face and provided with at least one recess, so that said bottom as a result has a lesser wall thickness than in regions adjoining it; at least one injection point orientable with a molding channel of a molding tool, said injection point being disposed on said other face of said piston bottom which points away from said pressure-loadable face, said piston bottom having a lesser wall thickness in a region of said recess, said at least one recess being formed deep enough so that said other piston bottom face pointing away from said pressure-loadable face extends in a region of said injection point from a direction of said pressure-loadable face approximately as far as a plane that includes a neutral fiber of regions of said piston bottom that adjoins the region of said injection point, said other face of said piston bottom pointing away from said pressure-loadable face being provided with a radially outer annular groove; and a piston spring having one end which is braced in said radially outer annular groove.

* * * * *